United States Patent [19]
Hirano et al.

[11] Patent Number: 6,120,750
[45] Date of Patent: Sep. 19, 2000

[54] METHOD OF PRODUCING LEAD-CONTAINING COMPLEX OXIDES

[75] Inventors: Shinichi Hirano, 2, Ogawa Maruikedai 3-chome, Higashiura-cho, Chita-gun, Aichi-ken; Yusuke Hirabayashi, Saitama-ken; Toshinobu Yogo; Wataru Sakamoto, both of Aichi-ken, all of Japan

[73] Assignees: Honda Giken Kobyo Kabushiki Kaisa, Tokyo; Shinichi Hirano, Aichi-ken, both of Japan

[21] Appl. No.: 09/273,275

[22] Filed: Mar. 22, 1999

[30] Foreign Application Priority Data

Mar. 26, 1998 [JP] Japan ................... 10-098440

[51] Int. Cl.[7] .................... C01G 23/02; C01G 21/02; C01G 25/02
[52] U.S. Cl. ................ 423/598; 423/92; 423/93; 423/593
[58] Field of Search ............... 423/92, 93, 593, 423/598

[56] References Cited

U.S. PATENT DOCUMENTS 4,789,653 12/1988 Ogata et al. .
5,112,433 5/1992 Dawson et al. .

FOREIGN PATENT DOCUMENTS

| 60-103031 | 6/1985 | Japan . |
| 3-85014 | 4/1988 | Japan . |
| 2-212316 | 8/1990 | Japan . |
| 5-306122 | 11/1993 | Japan . |
| 8-136342 | 5/1996 | Japan . |

Primary Examiner—Steven P. Griffin
Assistant Examiner—Christina Ildebrando
Attorney, Agent, or Firm—Morrison & Foerster, LLP

[57] ABSTRACT

A lead-containing complex oxide containing substantially no alkali metal is produced under hydrothermal conditions in the absence of alkali metals using a Pb source which serves also as a mineralizer for precipitating the lead-containing complex oxide. Preferred Pb source acting as the mineralizer is lead oxide.

4 Claims, 7 Drawing Sheets

● A-Site Atom: Pb

○ Face Center: O

◍ B-Site Atom: Ti or Zr

METHOD OF PRODUCING LEAD-CONTAINING COMPLEX OXIDES

BACKGROUND OF THE INVENTION

The present invention relates to a method of producing a lead-containing complex oxide without using any alkali metal hydroxide as a mineralizer.

The lead-containing complex oxide, particularly lead zirconate titanate $Pb(Zr,Ti)O_3$ (PZT), is a well known ferroelectric ceramic material with good piezoelectric properties, and have been applied to various fields such as dielectric ceramics, piezoelectric ceramics, pyroelectric ceramics, resistive ceramics, semiconductive ceramics, etc. mainly as a piezoelectric element for SAW filter, sensor, actuator, etc., capacitor, nonvolatile memory (FERAM), etc.

PZT has been synthesized by various methods such as solid phase reaction, liquid phase reaction, sol-gel process and hydrothermal synthesis.

Since the solid state reaction is conducted at higher temperatures, Pb showing a low vapor pressure is vaporized during the heating to change the composition of the reaction mixture, thereby failing to produce a lead-containing complex oxide of the desired composition. In addition, the complex oxide particles synthesized by this method are not uniform in shapes and the particle size distribution is deflected. In the liquid phase reaction, the components of the starting materials are coprecipitated with each other. Since the optimum pH for precipitation varies among the components, the pH control for the coprecipitation is quite difficult. An additional disadvantage of this method is the generation of hydrates, which requires an additional heat treatment at a high temperature. Since metal alkoxides are used as the starting materials, the sol-gel process requires the use of organic solvents. In addition, since a heating process at a high temperature is needed, the compositional change of the reaction mixture occurs due to the vaporization of Pb thereby failing to produce a lead-containing complex oxide of the desired composition.

Japanese Patent Laid-Open No. 63-85014 proposes a method of producing PZT powders where a water-soluble lead salt, a water soluble titanium salt and a water soluble zirconium salt are dispersed in an aqueous alkaline solution containing an alkali metal hydroxide, and then subjected to hydrothermal reaction at 50–300° C. The PZT powder produced by this method contains about 0.01–0.07% alkali metal such as K and Na derived from the mineralizer used even after the powder is thoroughly washed with water, etc. Most of the alkali metal adheres to the surface of the PZT particles. However, since a part thereof enters into the crystalline structure of PZT, the amount of the residual alkali metal in the PZT powder is very difficult to be further reduced. The addition of a metal ion, such as an alkali metal ion, having a valence different from that of the constituent metal ions of PZT causes the change of valence of the constituent metal ion and the existence of oxygen vacancies in the crystalline structure of PZT. As a result thereof, a PZT ceramic becomes semiconductive and has a reduced insulating property. In addition, the residual alkali metal serves as an acceptor to increase the coercive electric field and lower the insulating property of PZT to result in the reduction or loss of electric properties such as piezoelectric effect, etc. Thus, the use of alkali metal hydroxide needs an additional washing step for removing the alkali metal from the PZT powder, and involves a problem of reduction in electric properties due to the residual alkali metal because the alkali metal is not sufficiently removed by the additional washing step.

Japanese Patent Laid-Open No. 2-212316 discloses a method of producing PZT powders where the PZT is produced through a step of precipitating a lead-containing hydroxide from a reaction between a water-soluble lead compound and an aqueous solution of alkali metal with a low concentration, and a subsequent step of hydrothermal reaction. However, this method fails to prevent the alkali metal from remaining in the PZT powder.

OBJECT AND SUMMARY OF THE INVENTION

Accordingly, an object of the present invention is to provide a method of producing a lead-containing complex oxide having excellent electric properties, which prevents alkali metal from being included in the resulting lead-containing complex oxide by avoiding the use of an alkali metal hydroxide as a mineralizer.

As a result of the intense research in view of the above objects, the inventors have found that lead oxide (PbO) as a Pb source serves also as a mineralizer because PbO dissolved in an aqueous medium is converted into lead hydroxide ($Pb(OH)_2$) to make the resultant aqueous solution weakly alkaline.

Thus, the method of producing a lead-containing complex oxide of the present invention is characterized in that a Pb source is utilized also as a mineralizer for precipitating the lead-containing complex oxide, thereby to conduct any of the steps of the method substantially in the absence of alkali metals.

DETAILED DESCRIPTION OF THE INVENTION

The present invention will be described below more in detail.

The method of the present invention will be described in reference to the production of PZT. However, it should be noted that the present invention is not limited to the production of PZT, but other lead-containing complex oxides may be equally produced by substantially the same method as described below.

1. Starting Materials

The Pb source is preferably lead oxide (PbO). As the Ti source and the Zr source, inorganic salts, alkoxides and acetylacetonates of Ti or Zr are preferably used. $TiCl_4$ is unfavorable because it is strongly acidic and liable to form $Ti(OH)_4$.

Since PbO dissolves into a reaction liquid to form $Pb(OH)_2$, PbO is used in an amount larger than the theoretical amount required by the desired composition of the lead-containing complex oxide. Specifically, the molar ratio of Pb/(Zr+Ti) is preferably 1.0 to 1.10. The Ti source and the Zr source are used in respective amounts corresponding to the desired Zr/Ti ratios.

2. Method of Production

A starting mixture of the Zr source and the Ti source in the desired Zr/Ti ratio is added with a solvent, and then refluxed under heating at around the boiling point of the solvent in nitrogen gas atmosphere until the Zr source and the Ti source are dissolved into the solvent. The solvent may be alcohol, preferably ethanol. After completely dissolved, the reaction mixture is cooled down to room temperature.

Then, the reaction product is hydrolyzed by adding dropwise a liquid mixture of a decarbonated, distilled water and the solvent to the reaction mixture at room temperature in nitrogen gas atmosphere. The use of the decarbonated, distilled water prevents the Zr/Ti ratio from being changed by the formation of carbonates thereof.

After the completion of the hydrolysis, the reaction mixture is stirred for 6 hours or longer at room temperature in nitrogen gas atmosphere, and then evaporated to dryness under reduced pressure to remove the solvent thereby obtaining a Zr/Ti powdery precursor.

A starting mixture is prepared by stirring a mixture of the Zr/Ti powdery precursor thus obtained, PbO as the Pb source and a decarbonated, distilled water at room temperature. The starting mixture reaches a pH of 8–12 due to the conversion of the dissolved PbO into $Pb(OH)_2$ without adding any alkali metal hydroxide as the mineralizer.

Figure 1:
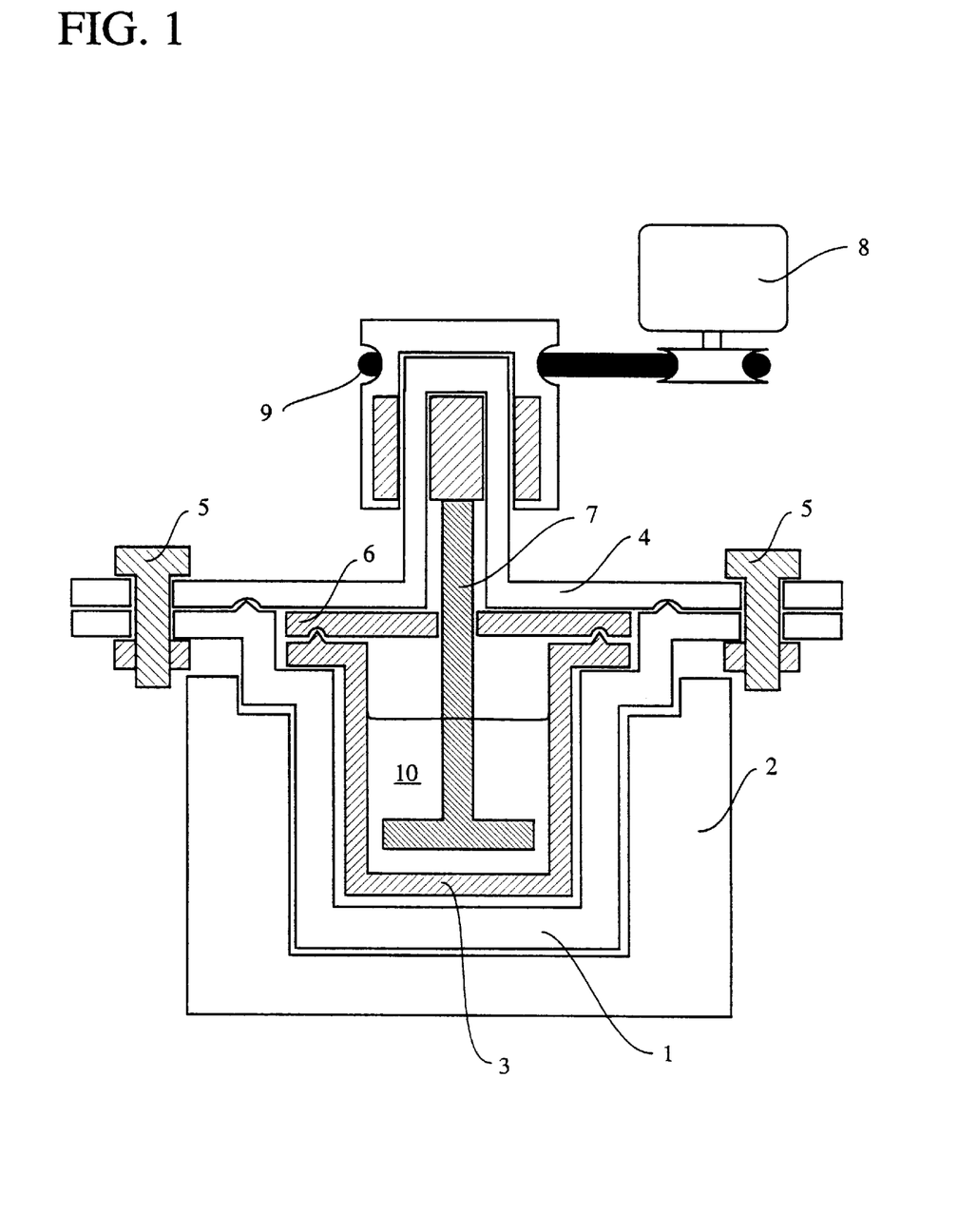
FIG. 1 is a schematic view showing a hydrothermal apparatus used in the present invention.

The starting mixture is then subjected to a hydrothermal process. The hydrothermal reaction is preferably conducted in a hydrothermal apparatus as shown in FIG. 1. A pressure-resistant vessel 1 made of stainless steel is covered on its lateral and lower surfaces with a heater 2 and receives a reaction vessel 3 with a cover 6 each made of Teflon (polytetrafluoroethylene). A stainless cover 4 is fixed to the flange of the pressure-resistant vessel 1 by bolts 5, 5. The rod of a stirrer 7 made of Teflon extends upward through the cover 6, which is rotated by a rubber belt 9 driven by a motor 8.

The starting mixture 10 in the reaction vessel 3 is heated to 150–250° C. by the heater 2 under stirring by the stirrer 7 at 250–350 rpm for 1–96 hours, preferably 11 hours or longer, to conduct the hydrothermal reaction.

After completing the reaction, the reaction mixture is cooled down to room temperature, and filtered with suction to collect powdery product. The powdery product is washed with distilled water and dried in a drying oven, etc. to obtain a powder of PZT.

3. Lead-Containing Complex Oxide

Figure 2:
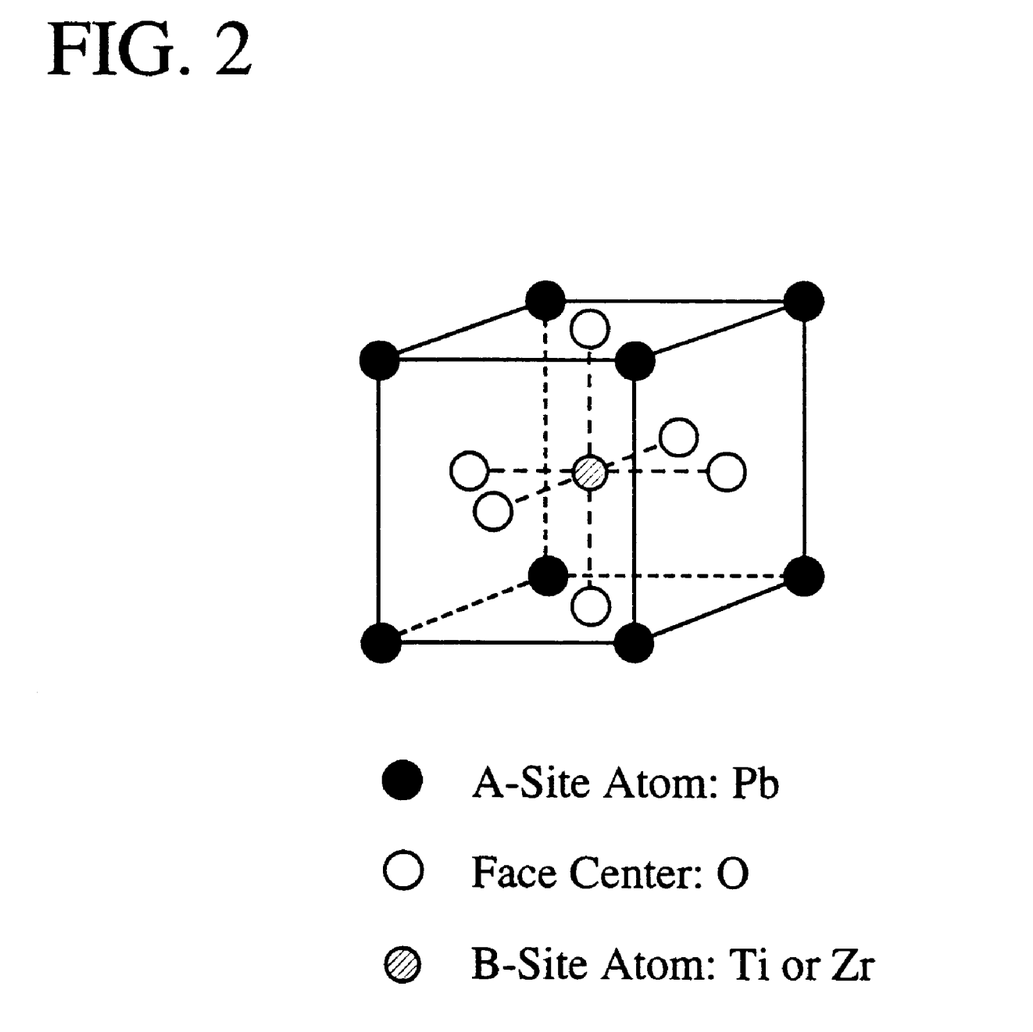
FIG. 2 is a schematic view showing the crystal structure of a perovskite-type lead zirconate titanate.

The lead-containing complex oxide produced by the method of the present invention has a perovskite structure as shown in FIG. 2 in which oxygen atoms form a octahedron with a body-centered B-site atom of Zr or Ti. The crystal system of the lead-containing complex oxide includes tetragonal, cubic, rhombohedral, and rhombic.

As described above, in the method of the present invention, the lead-containing complex oxide is synthesized in the absence of alkali metals under hydrothermal conditions. Therefore, the lead-containing complex oxide thus produced contains substantially no alkali metal to exhibit excellent electric properties.

The present invention will be further described while referring to the following Examples which should be considered to illustrate various preferred embodiments of the present invention.

EXAMPLE 1

A mixture of $1.04 \times 10^{-3}$ mol zirconium tetraethoxide with a purity of 99.9% and a molecular weight of 271.45 (product of Ko-Jundo-Kagaku Kenkyusho, Co.), $9.6 \times 10^{-4}$ mol titanium tetraisopropoxide with a purity of 99% and a molecular weight of 284.23 (product of Kishida Kagaku, Co.), and 20 ml purified ethyl alcohol (product of Kishida Kagaku, Co.) was refluxed for 24 hours at 78° C. under stirring in nitrogen gas atmosphere, and then the reaction mixture was cooled down to room temperature.

A solvent mixture was prepared by mixing 40 ml purified ethyl alcohol (product of Kishida Kagaku, Co.) with 0.72 ml distilled water decarbonated by refluxing for one hour at 100° C. in nitrogen gas. The solvent mixture was added dropwise to the reaction mixture under stirring at room temperature in nitrogen gas atmosphere to hydrolyze the alkoxides. The stirring was continued for 6 hours after the addition was completed, and the solvent was evaporated to dryness under reduced pressure to obtain dry powder.

A mixture of the dry powder thus obtained, $2.1 \times 10^{-3}$ mol PbO having a molecular weight of 223.20 (product of Kishida Kagaku, Co.), and 100 ml decarbonated water was stirred for one hour at room temperature to prepare a starting mixture.

The starting mixture was introduced into a reaction vessel (250 ml) of a hydrothermal apparatus, and subjected to a hydrothermal reaction at 200° C. under heating by a heater for 20 hours while stirring at 300 rpm. After the completion of the reaction, the reaction mixture was cooled down to room temperature and filtered with suction to collect the powdery product, which was washed by several portions of distilled water (500 ml in total) and dried in a drying oven at 80° C. for 12 hours under atmospheric pressure to obtain a powder of PZT.

Figure 3:
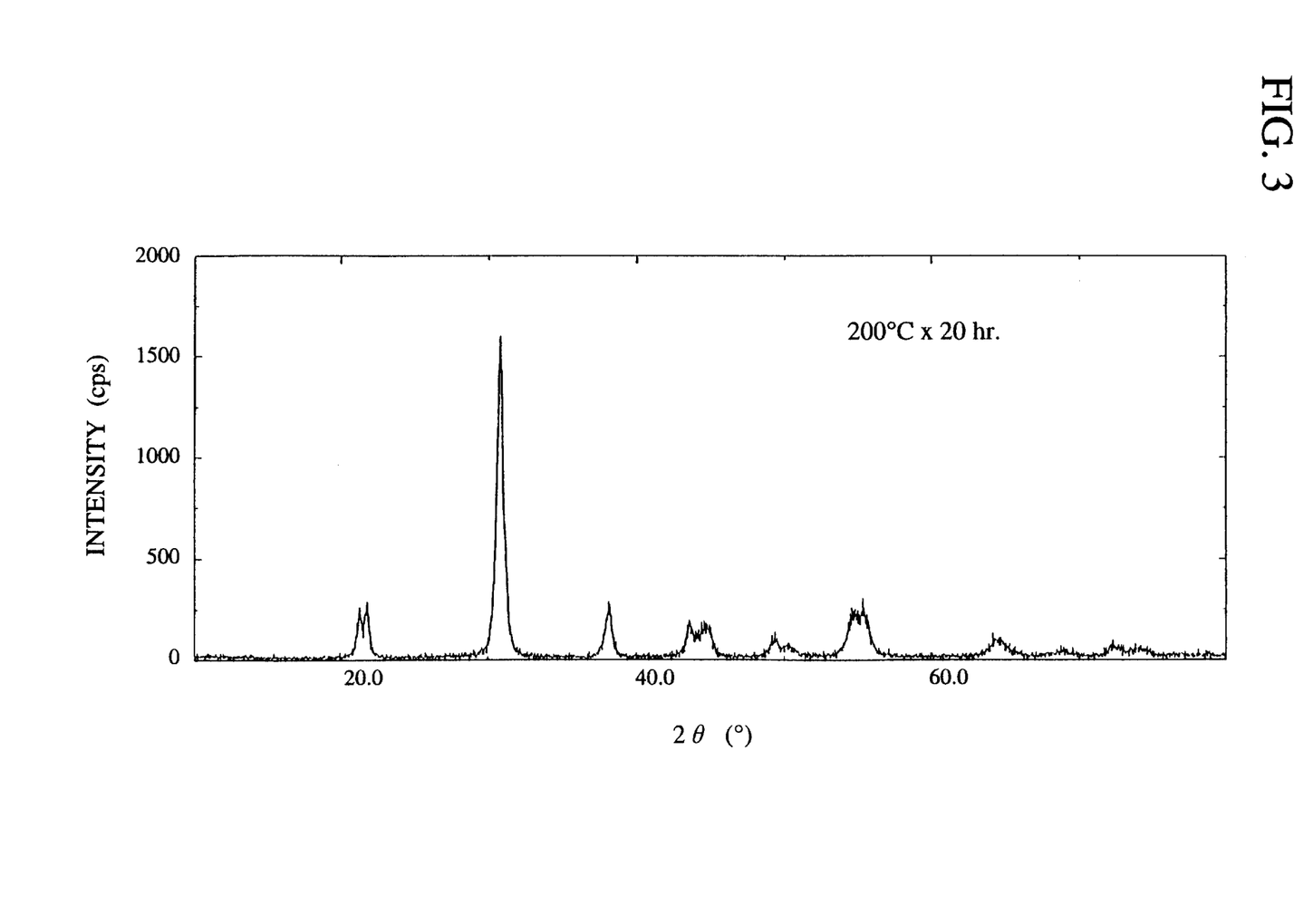
FIG. 3 is a chart showing X-ray diffraction pattern of the lead zirconate titanate produced in Example 1.

As the results of ICP atomic emission spectroscopy, no alkali metal was detected in the PZT powder thus obtained. Further, the results of X-ray diffraction analysis showed that the PZT powder has a perovskite structure. The X-ray diffraction pattern is shown in FIG. 3 and the hydrothermal conditions and the type of phase formed in PZT are shown in Table 1.

EXAMPLE 2

Figure 4:
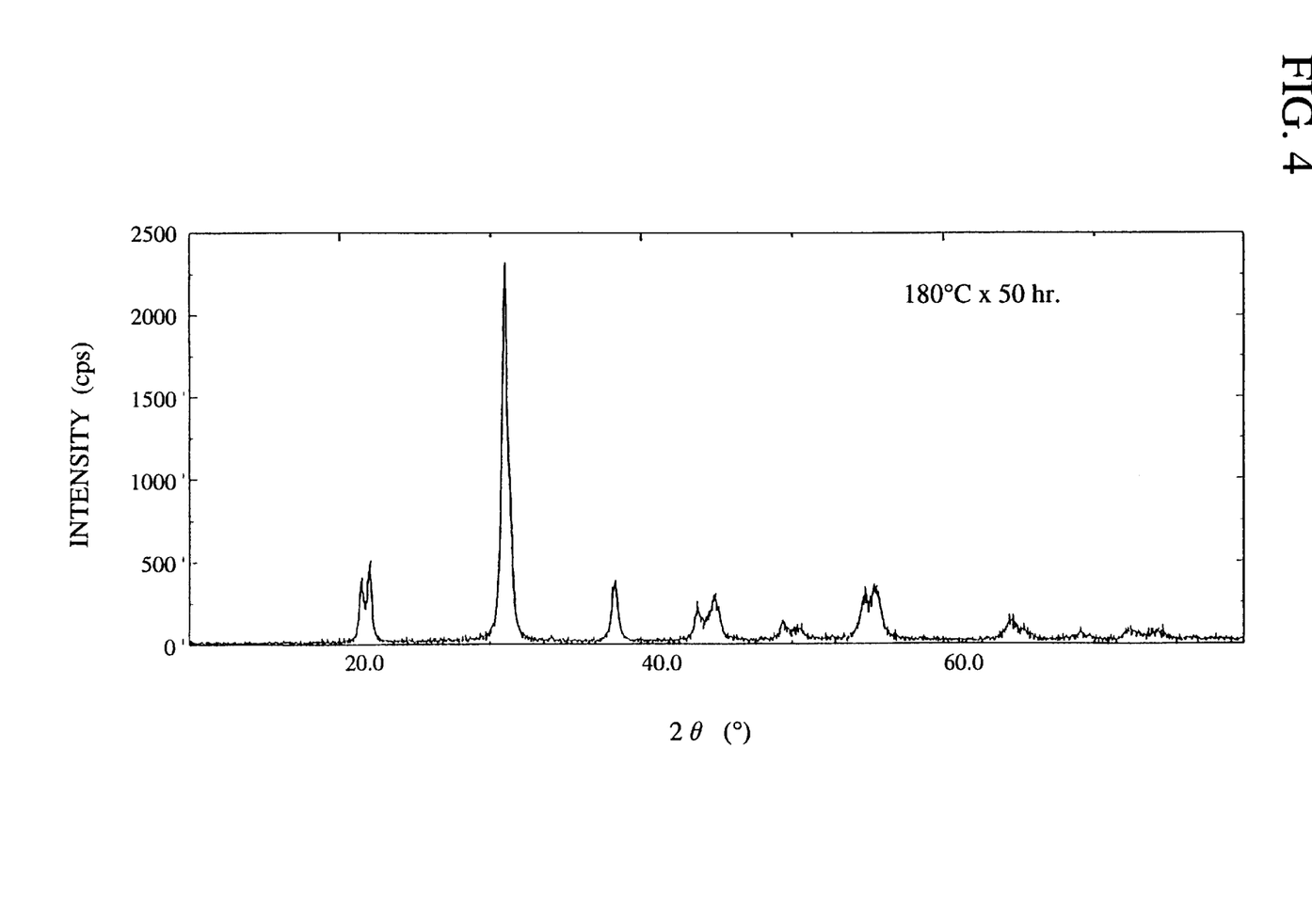
FIG. 4 is a chart showing X-ray diffraction pattern of the lead zirconate titanate produced in Example 2.
Figure 5:
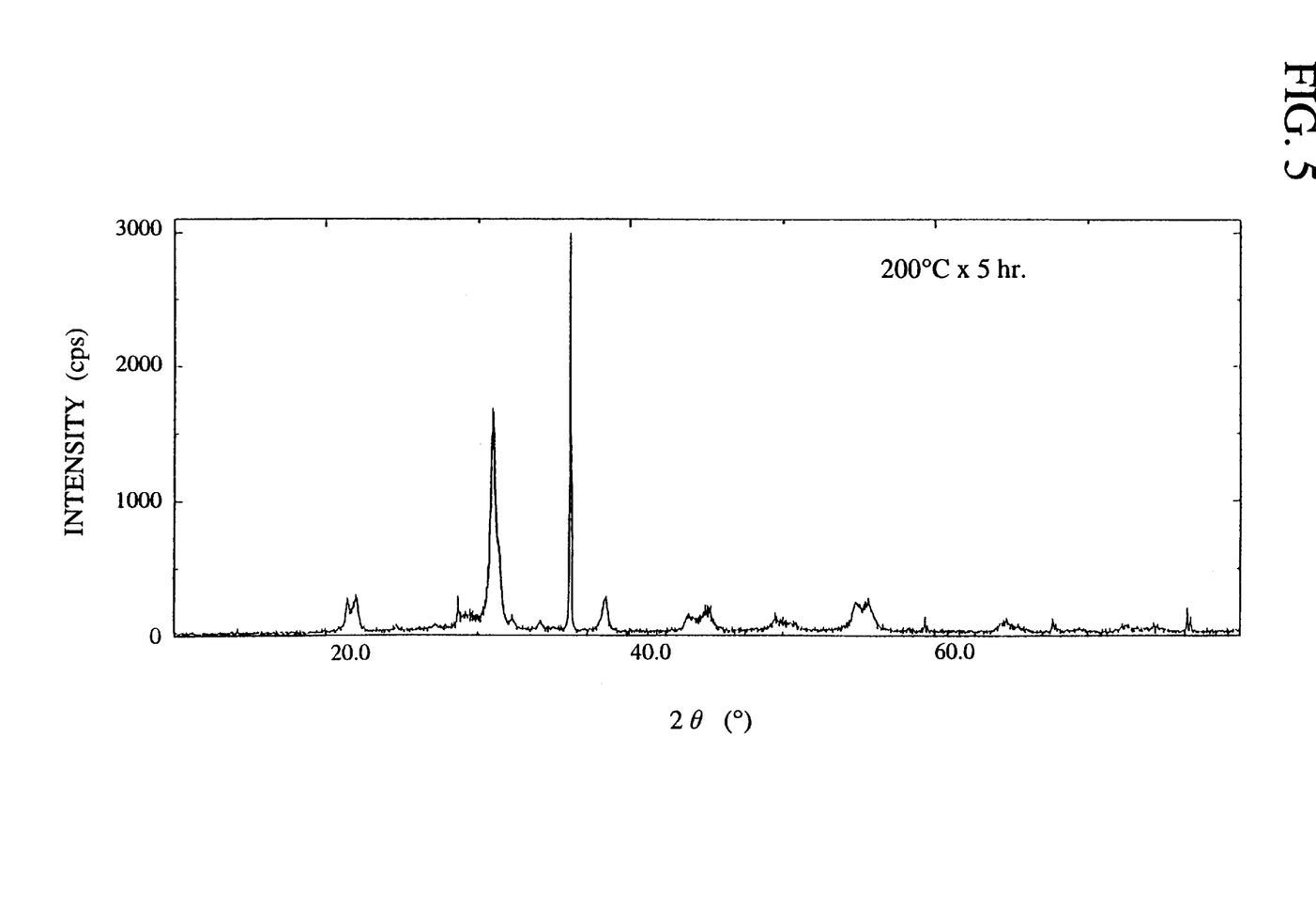
FIG. 5 is a chart showing X-ray diffraction pattern of the lead zirconate titanate produced in Reference Example 1.
Figure 6:
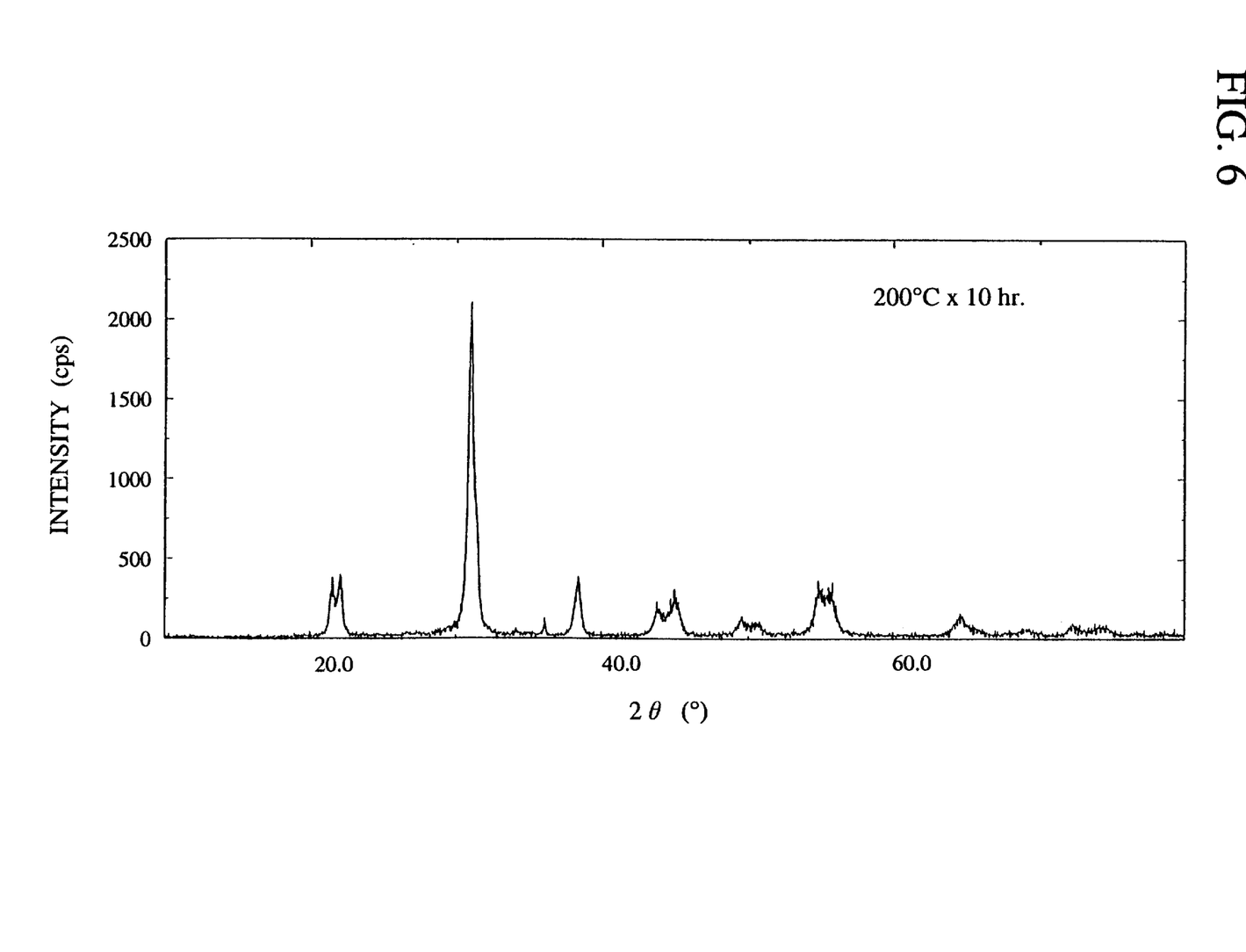
FIG. 6 is a chart showing X-ray diffraction pattern of the lead zirconate titanate produced in Reference Example 2.

In the same manner as in Example 1 except for the hydrothermal reaction was conducted at 180° C. for 50 hours, a powder of PZT was produced. As the results of ICP atomic emission spectroscopy, no alkali metal was detected in the PZT powder thus obtained. Further, the X-ray diffraction pattern shown in FIG. 4 showed that the PZT obtained was perovskite-structured.

EXAMPLE 3

A powder of PZT was produced in the same manner as in Example 1 except for using zirconium tetrapropoxide with a purity of 99.9% and a molecular weight of 327.2 (product of Kishida Kagaku, Co.). As the results of ICP atomic emission spectroscopy, no alkali metal was detected in the PZT powder thus obtained. Further, by X-ray diffraction analysis, the PZT obtained was found to be perovskite-structured.

REFERENCE EXAMPLES 1–2

Each powder of PZT was produced in the same manner as in Example 1 except for changing the hydrothermal conditions as shown in Table 1. The results of X-ray diffraction analysis showed that each PZT had unknown phase in addition to perovskite phase because the X-ray diffraction pattern included diffraction peaks which could not be identified to any reported phase.

TABLE 1

| No. | Hydrothermal Conditions | | Phase of PZT |
|---|---|---|---|
| | Temperature (° C.) | Time (hour) | |
| Example 1 | 200 | 20 | Perovskite Phase |
| Example 2 | 180 | 50 | Perovskite Phase |
| Example 3 | 200 | 20 | Perovskite Phase |
| Reference Example 1 | 200 | 5 | Perovskite Phase + Unknown Phase |
| Reference Example 2 | 200 | 10 | Perovskite Phase + Unknown Phase |

COMPARATIVE EXAMPLE 1

Figure 7:
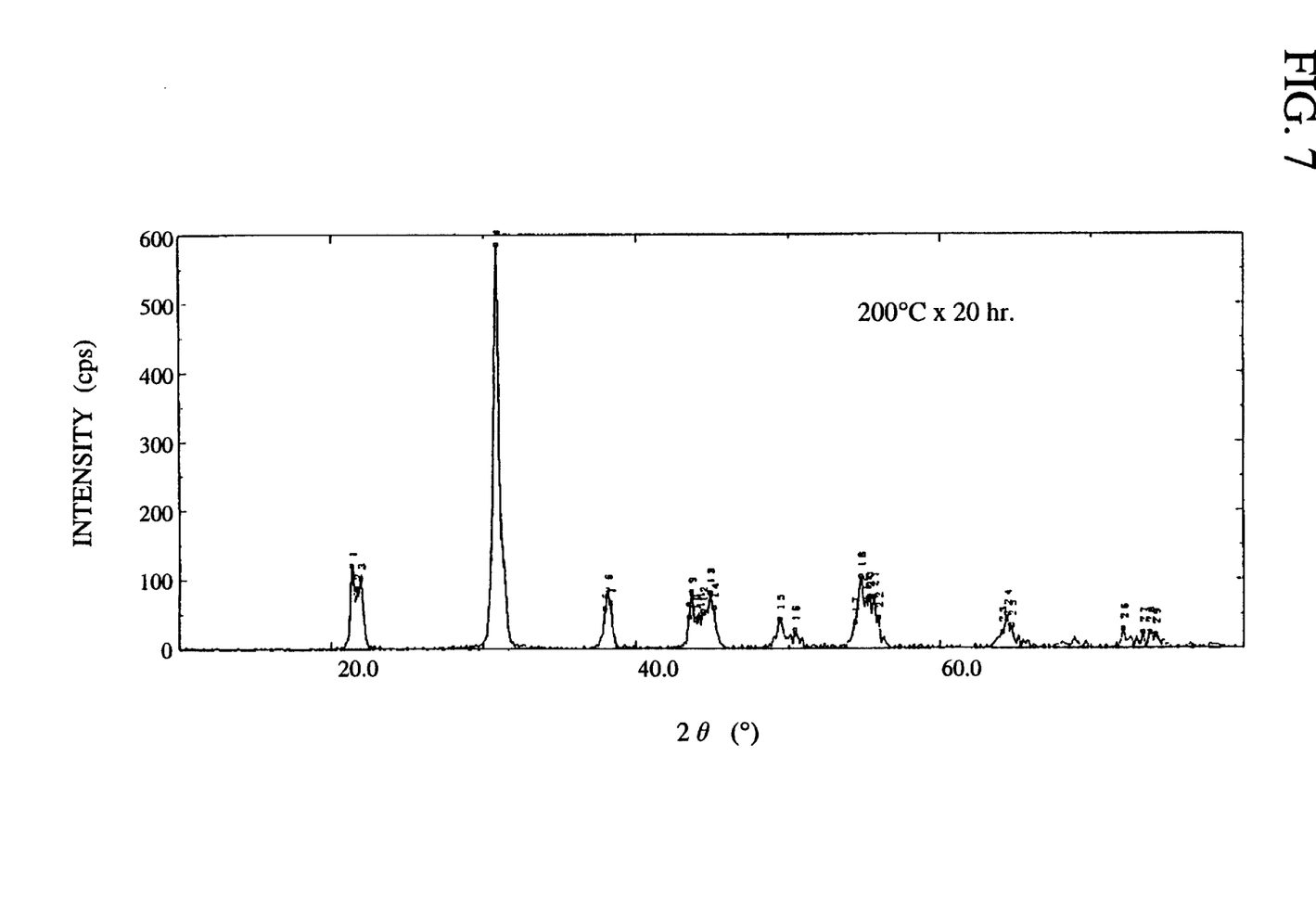
FIG. 7 is a chart showing X-ray diffraction pattern of the lead zirconate titanate produced in Comparative Example 1.

The same procedures of Example 1 were repeated except that the starting mixture for hydrothermal reaction was prepared by using 100 ml aqueous KOH solution (concentration: 1 mol/liter) instead of 100 ml decarbonated water, to obtain a powder of PZT, which was then washed by several portions of distilled water (500 ml in total) and dried in a drying oven at 80° C. for 12 hours under atmospheric pressure. The X-ray diffraction pattern of the obtained PZT is shown in FIG. 7. Further, the result of ICP atomic emission spectroscopy showed that the washed PZT powder contained 0.05 weight % of potassium.

What is claimed is:

1. A method of producing a lead-containing complex oxide containing substantially no alkali metals, comprising:

preparing a Zr/Ti precursor by (a) making a solution comprising a compound selected from the group consisting of an alkoxide of Ti, an acetylacetonate of Ti, an alkoxide of Zr and an acetylacetonate of Zr, (b) hydrolyzing said solution to form a reaction product and (c) drying said reaction product;

mixing said Zr/Ti precursor, a lead-containing mineralizer and water to prepare a starting mixture having a pH of 8–12;

subjecting said starting mixture to hydrothermal reaction to form a hydrothermal reaction product; and separating, washing and drying said hydrothermal reaction product;

wherein said method is conducted without adding an alkali metal to said starting mixture.

2. The method according to claim 1, wherein said lead-containing mineralizer is lead oxide.

3. The method according to claim 1, wherein said lead-containing complex oxide is a perovskite-structured lead zirconate titanate represented by $Pb(Zr,Ti)O_3$.

4. The method according to claim 2, wherein said lead-containing complex oxide is a perovskite-structured lead zirconate titanate represented by $Pb(Zr,Ti)O_3$.

* * * * *